United States Patent [19]
Hirabayashi et al.

[11] Patent Number: 5,275,434
[45] Date of Patent: Jan. 4, 1994

[54] AIRBAG OF VEHICULAR AIRBAG RESTRAINT SYSTEM

[75] Inventors: Hirokazu Hirabayashi; Hironori Yoshikawa, both of Kanagawa, Japan

[73] Assignee: Nissan Motor Co., Ltd., Yokohama, Japan

[21] Appl. No.: 788,231

[22] Filed: Nov. 5, 1991

[30] Foreign Application Priority Data

Nov. 21, 1990 [JP] Japan ................... 2-316982

[51] Int. Cl.⁵ .............................................. B60R 21/02
[52] U.S. Cl. ..................... 280/743 R; 280/728 R; 139/389; 428/112; 428/232; 428/258; 428/287
[58] Field of Search ........... 280/728, 733, 743, 428/232, 258, 259, 287, 112; 139/389

[56] References Cited

FOREIGN PATENT DOCUMENTS 1435089 3/1970 Fed. Rep. of Germany ...... 428/258
2-158442 6/1990 Japan .

*Primary Examiner*—Margaret A. Focarino
*Assistant Examiner*—Paul Dickson
*Attorney, Agent, or Firm*—Foley & Lardner

[57] ABSTRACT

An airbag of an airbag restraint system for an automotive vehicle. The airbag is formed of a circular doubly woven cloth including generally circular front and rear cloth parts which are separable from and integral at their periphery with each other to define therebetween a gas chamber to be filled with high pressure gas from an inflator. Each of front and rear cloth parts is formed with a generally rectangular reinforcement regions located near the periphery of the cloth part. The reinforcement region includes two warp band-like regions which are separate from each other and located near the periphery of the cloth part. The reinforcement region further includes two weft band-like regions which are separate from each other and located near the periphery of the cloth part. The weft band-like regions cross the warp yarn band-like regions, so that the reinforcement region is formed generally rectangular. Reinforcement yarns are woven in each of the warp and weft band-like regions. The reinforcement yarns are higher in coefficient of extension than the warp and weft yarns.

7 Claims, 4 Drawing Sheets

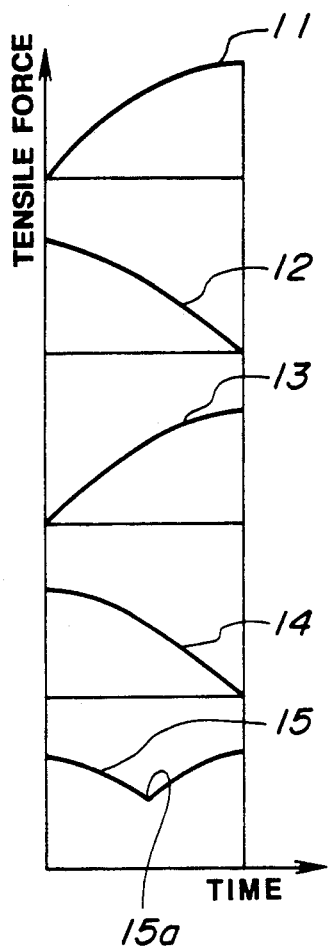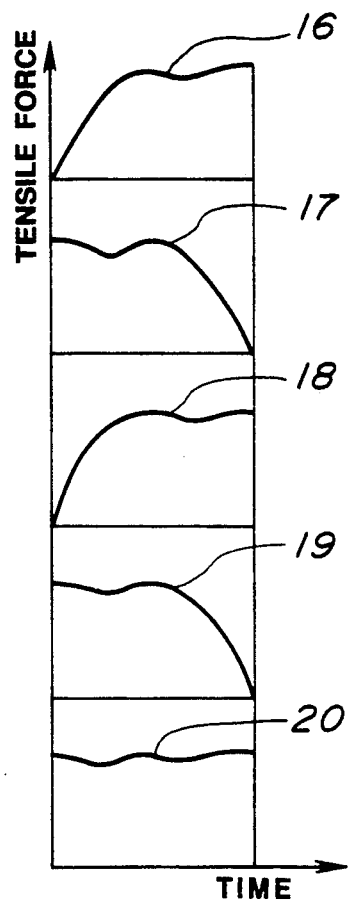

AIRBAG OF VEHICULAR AIRBAG RESTRAINT SYSTEM

BACKGROUND OF THE INVENTION

1. Field of the Invention

This invention relates to improvements in an airbag of a vehicular airbag restraint system, and more particularly to the airbag formed of a doubly woven cloth defining therein a gas chamber to be filled with high pressure gas from an inflator.

2. Description of the Prior Art

There are a variety of airbag restraint systems which have been proposed and put into practical use. These systems are usually constructed and arranged as follows: When a vehicle deceleration, due to a vehicle collision, exceeds predetermined level, an initiator is ignited to start the operation of an inflator or gas generator, thereby inflating and developing an airbag from its folded state. Accordingly, a vehicle passenger is protected from coming into direct contact with an instrument panel and/or a front windshield of an automotive vehicle.

The airbag is usually formed of front and rear side singly woven cloths, in which the woven cloths are sewn at their peripheral portions with each other to form a bag-shape. However, frays tends to occur at the peripheral portions of the singly woven cloths, while the singly woven cloths are insufficient in strength. For such an airbag, it is necessary to separately provide to the peripheral portion a sewn part for the purpose of reinforcement, thereby increasing the number of steps in the production process of it and the production cost of the same.

In view of the above, the airbag has been recently proposed to form an airbag of a doubly woven cloth in place of the above-mentioned singly woven cloths. An example of such an airbag formed of the doubly woven cloth is disclosed in Japanese Patent Provisional Publication No. 2-158442. Such an airbag includes front an rear side (singly woven) cloth parts which are separate from each other, but which are integral at their peripheral portion with each other thereby defining therebetween a gas chamber to be fed with high pressure gas from an inflator.

In the production of such an airbag, it is unnecessary to sew the peripheral portions of two separate (singly woven) cloths with each other to form the airbag. Additionally, it is also unnecessary to reinforce the peripheral portions of the cloths. Thus, a sewing step can be omitted, thereby lowering the production cost while simplifying a production process of the airbag.

However, drawbacks have been encountered in the airbag formed of the doubly woven cloth, in which when a stress is concentrically and locally applied to the airbag from the outside, the airbag tends to be broken under the influence of such a stress. More specifically, the airbag usually requires a central opening (not shown) in one of the cloth parts. Through the central opening, high pressure gas is supplied inside the airbag. Accordingly, the airbag tends to easily tear or break when a high stress is concentrically and locally applied to the airbag cloth at a portion around the central opening. Additionally, inflation regulating belt members may be required to be disposed inside the airbag in order to prevent the airbag from unnecessarily inflating. The belt members are usually sewn to the inner surface of the airbag. It will be understood that when a stress is concentrically and locally applied to the woven cloth of the airbag through each belt member, the airbag tends to easily tear or break at the positions where the belt members are sewn.

Thus, the airbag tends to tear or break at particular positions where the high stress is concentrically applied. When a tearing or breakage occurs in the airbag, the airbag cannot inflate uniformly to obtain a predetermined desirable shape, thereby providing a non-uniform impact softening force against a vehicle passenger during a vehicle collision or the sudden stopping of a vehicle. In order to prevent such drawbacks, it is necessary to provide a reinforcement patch around the central opening of the airbag and reinforcement members at positions where the inflation regulating belt members are sewn to the airbag. These reinforcement members unavoidably complicate the production process and raise the production cost of the airbag.

SUMMARY OF THE INVENTION

An object of the present invention is to provide an improved airbag of a vehicular airbag restraint system, which can overcome drawbacks encountered in conventional airbags.

Another object of the present invention is to provide an improved airbag of a vehicular airbag restraint system, which is easy to produce and is low in production cost.

A further object of the present invention is to provide an improved airbag formed of a doubly woven cloth, which does not require any reinforcement members such as reinforcement patches for preventing the cloth material of the airbag from tearing or breaking.

An airbag of the present invention is inflatable under the pressure of gas from an inflator. The airbag is formed of a doubly woven cloth including first and second (front and rear) cloth parts which are separable from each other to define therebetween a chamber to be filled with the gas from the inflator. Each of the first and second cloth parts is woven with warp yarns and weft yarns. A reinforcement region is formed in at least one of the first and second cloth parts and is located near the periphery of the doubly woven cloth. The region includes a warp region extending parallel with an extension direction of the warp yarns, and a weft region extending parallel with an extension direction of the weft yarns. The warp and weft regions are continuous with each other. Reinforcement yarns are woven in the warp and weft regions. The reinforcement yarns are higher in coefficient of extension than the warp and weft yarns.

By virtue of the fact that the reinforcement region located near the periphery of the doubly woven cloth is constituted of the reinforcement yarns having a high coefficient of extension, the reinforcement region is higher in rigidity than other regions around it. Therefore, if the reinforcement region is located around a central opening through which high pressure gas is introduced inside the airbag or located such that inflation regulating belt members are sewn thereto, the airbag can be effectively prevented from tearing or breaking even in the event that a high stress is concentrically applied during inflation of the airbag when it is supplied with the high pressure gas from the inflator during a vehicle collision or an abrupt stopping of the vehicle.

Accordingly, an airbag restraint system which includes the airbag of the present invention becomes high in operational reliability, and a prolonged life. The reinforcement region can be easily and automatically formed in the doubly woven cloth of the airbag merely by programming the procedure for formation thereof in a program of weaving the doubly woven cloth as the material of the airbag, upon using a computer-controlled weaving loom. The existence of the reinforcement region renders unnecessary the requirement for reinforcement members, such as reinforcement patches, and troublesome sewing steps during the production process of the airbag. These improvements greatly simplify the production process and lower the production cost of the airbag.

BRIEF DESCRIPTION OF THE DRAWINGS

FIGS. 3A and 3B are graphs showing tensile force distributions of a conventional airbag and the airbag in terms of time during inflation of the airbags of the present invention;

DETAILED DESCRIPTION OF THE INVENTION

Figure 1:
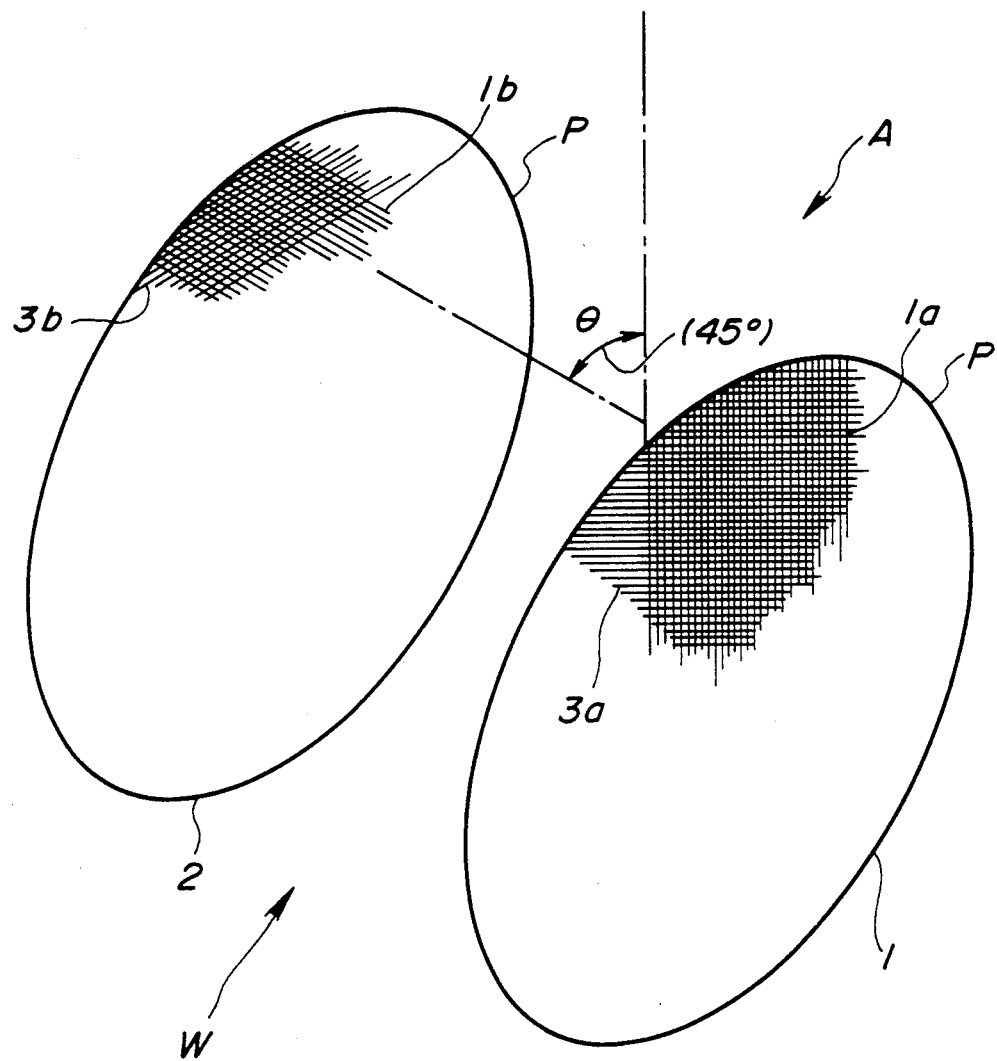
FIG. 1 is an exploded perspective view of an embodiment of an airbag in accordance with the present invention.
Figure 2:
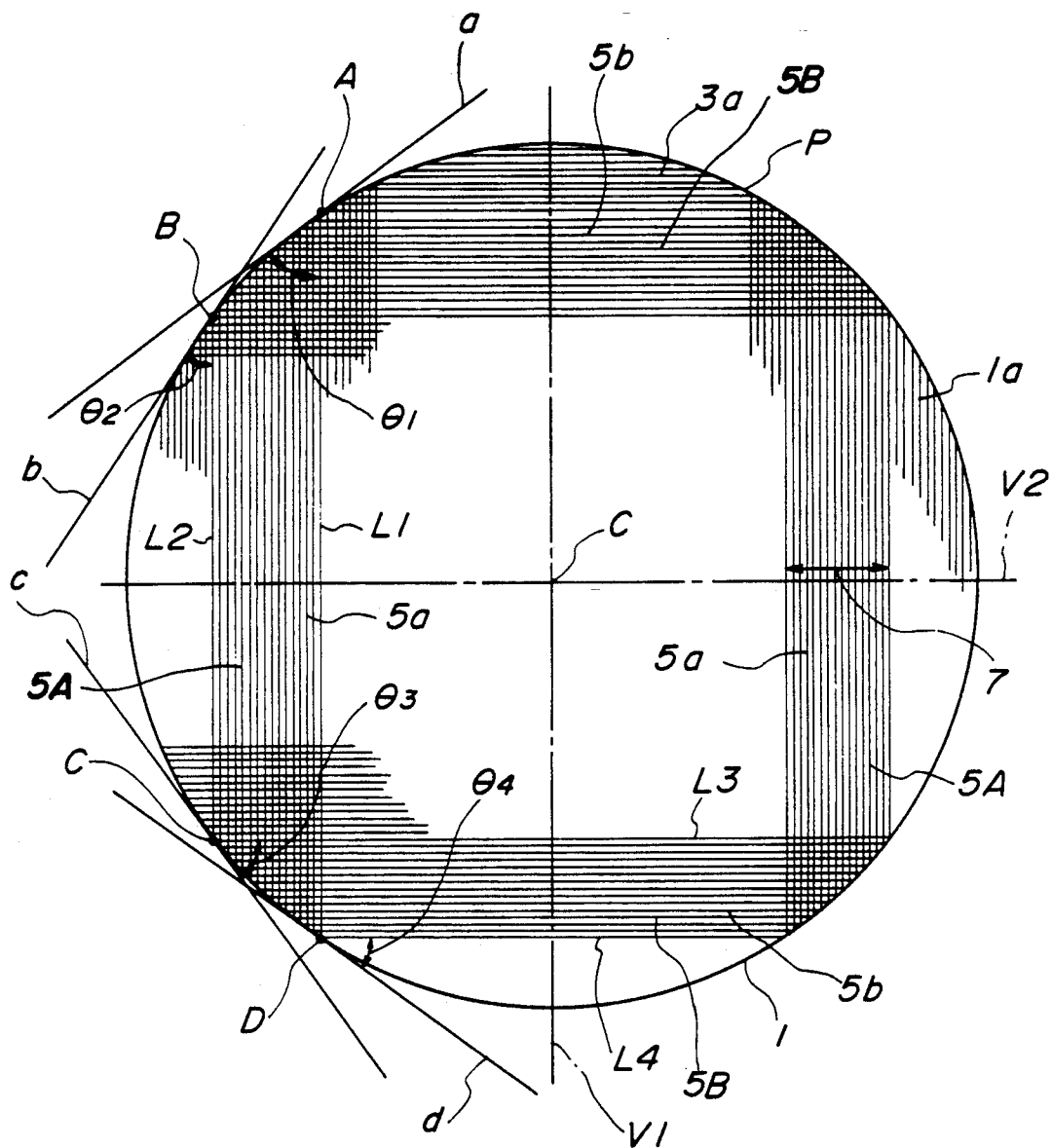
FIG. 2 is a front elevation of the airbag of FIG. 1.

Referring now to FIGS. 1 and 2, a preferred embodiment of an airbag according to the present invention is illustrated by the reference character A. The airbag A forms part of an airbag restraint system (not shown) of an automotive vehicle shown). The airbag restraint system is arranged such that the airbag A is inflated automatically, any time a front-end collision occurs, under the influence of high pressure gas which is supplied from an inflator (not shown), thereby protecting a vehicle driver or passenger from coming into direct contact with either a steering wheel or a windshield of the automotive vehicle. The airbag A is formed of a generally circular doubly woven cloth W which includes circular front and rear side (singly woven) cloth parts 1, 2. The front and rear side cloth parts 1, 2 are integrally woven so as to be integral with each other at their peripheral portion P though the front and rear side cloths 1, 2 are shown separate from each other in FIG. 1. Thus, the front and rear side cloth parts 1, 2 are fixedly secured at their peripheries with each other to form a bag-shaped structure defining thereinside a gas chamber to be supplied with high pressure gas. In other words, in the weaving of the doubly woven cloth W, first and second warp yarns 1a, 1b are used in which the first warp yarns 1a are for the front side cloth 1 while the second warp yarns 1b are for rear side cloth 2. Additionally, first and second weft yarns 3a, 3b are used in which the first weft yarns 3a are interlaced with the the first warp yarns 1a to form the front side cloth part while the second weft yarns 3b are interlaced with the second warp yarns 1b to form the rear side cloth part 2.

In the doubly woven cloth W of the example of FIG. 1, each warp yarn 1a of the front side cloth part 1 and each warp yarn 1b of the rear side cloth part 2 are arranged to form an angle $\theta$ of about 45 degrees therebetween. The warp yarns and the weft yarns 1a, 3a, 1b, 3b are selected to have respectively suitable coefficients of extension or elongation percentage.

In this embodiment, reinforcement warp yarns 5a are woven into the front side cloth part 1 in a manner to extend parallel with the first warp yarns 1a. Additionally, reinforcement weft yarns 5b are woven into the front side cloth part 1 in a manner to extend parallel with the first weft yarns 3a. The reinforcement warp and weft yarns 5a, 5b are prepared separately from the first warp and weft yarns 1a, 3a and are smaller in coefficient of extension (elongation percentage) than the second warp and weft yarns 1a, 3a. Additionally, the reinforcement warp and weft yarns may be higher in tensile strength than the warp and weft yarns 1a, 3a. It will be understood that the reinforcement warp yarns 5a are interlaced with the first warp yarns 1a while the reinforcement weft yarns 5b are interlaced with the first weft yarns 3a. Thus, the front side cloth part 1 of the doubly woven cloth W is woven with the first warp and weft yarns 1a, 3a and the reinforcement warp and weft yarns 5a, 5b.

The reinforcement warp yarns 5a constitute first and second band-like or warp regions 5A, 5A which are spaced from and symmetrical with each other with respect to a first imaginary vertical plane V1 passing through the center C of the front side cloth part 1a. The first and second band-like regions 5A, 5A are located near the periphery P of the circular front side cloth part 1. The reinforcement weft yarns 5b constitute third and fourth band-like or warp regions 5B, 5B which are spaced from and symmetrical with each other with respect to a second imaginary vertical plane V2 perpendicular to the plane V1 and passing the center C of the front side cloth part 1. The third and fourth band-like regions 5B, 5B are located near the periphery P of the circular front side cloth part 1.

Thus, the first, second, third and fourth band-like regions constitute a generally rectangular (square) reinforcement region 7 located generally along the periphery P of the front cloth part 1, in which the reinforcement warp yarns 5a are also interlaced with the reinforcement weft yarns 5b at portions close to the periphery P of the front side cloth part 1 as shown in FIG. 1.

Each of the first and second band-like regions 5A, 5A is defined within a range between a first line L1 and a second line L2 in plan of the front side cloth part 1 as shown in FIG. 2. The first line L1 forms an angle $\theta_1$ of about 55 degrees between it and a tangent line a which touches the circle (not identified) corresponding to the periphery P of the front side cloth part 1, at a point A through which the first line L1 passes. The first line L1 is parallel with the extension direction of the warp yarns 1a. The second line L2 forms an angle $\theta_2$ of about 35 degrees between it and a tangent line b which touches the circle (the periphery P) at a point B through which the second line L2 passes. The second line L2 is parallel with the extension direction of the warp yarns 1a.

Each of the third and fourth band-like regions 5B, 5B is defined between a third line L3 and a fourth line L4 in plan of the front side cloth part 1 as shown in FIG. 2. The third line L3 forms an angle $\theta_3$ of about 55 degrees between it and a tangent line c which touches the circle (the periphery P) at a point C through which the third line L3 passes. The third line L3 is parallel with the extension direction of the warp yarns 3a. The fourth line L4 forms an angle $\theta_4$ of about 35 degrees between it and a tangent line d which touches the circle (the periphery P) at a point D through which the fourth line L4 passes. The fourth line L4 is parallel with the extension direction of the weft yarns 5b.

By defining the first, second, third and fourth band-like regions 5A, 5A, 5B, 5B as discussed above, the reinforcement region 7 is formed continuous in a generally square shape having predetermined widths and is located close to the periphery P of the front side cloth part 1. It will be appreciated that the reinforcement warp and weft yarns 5a, 5b can be easily woven into the front side cloth part 1 by providing a procedure for the reinforcement yarns 5a, 5b in a program for weaving the doubly woven cloth W, the program being of a computer in case the weaving operation of the doubly woven cloth W is controlled by the computer incorporated in a weaving loom, though not shown.

In this embodiment of the airbag A, the rear side cloth part 2 as shown in FIG. 1 is constructed and arranged the same as the front side cloth part 1, 2, so that the reinforcement warp and weft yarns 5a, 5b are woven into the rear side cloth part 2 within the reinforcement region 7 shown in FIG. 2. Thus, according to this embodiment, the front and rear side cloth parts 1, 2 are respectively formed with generally square reinforcement regions 7, 7 located generally along the peripheries P of each cloth part 1, 2. It will be appreciated that each reinforcement region 7 is higher in rigidity than other regions around the region 7 since the reinforcement yarns 5a, 5b are higher in coefficient of extension than the warp yarns 1a, 1b and the weft yarns 3a, 3b.

Figure 4:
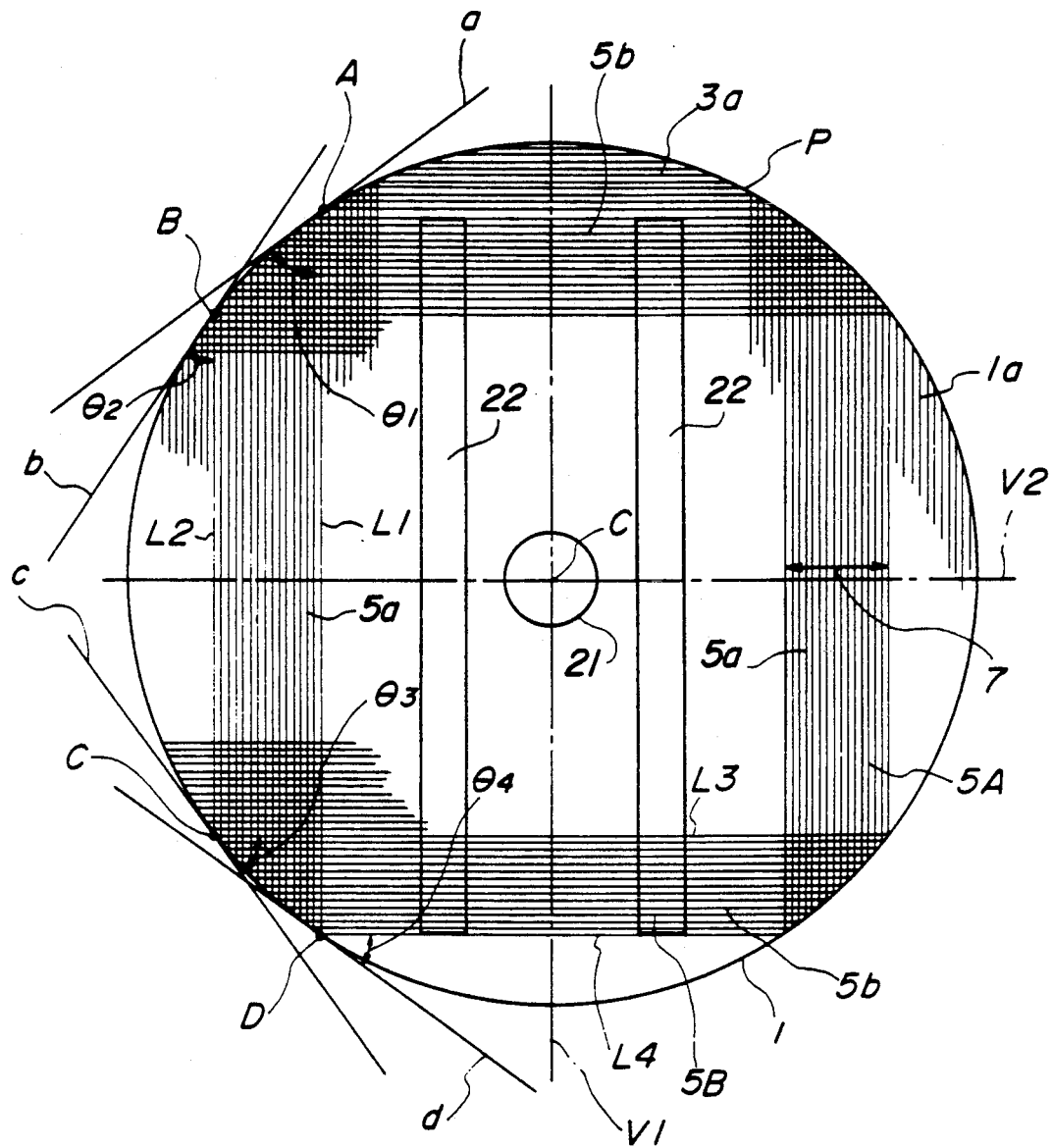
FIG. 4 is an elevational view of the rear side cloth of the airbag of FIG. 1 as viewed from the inside of the airbag.

In this embodiment, the rear side cloth part 2 is formed with a central opening (21) schematically shown in FIG. 4 through which high pressure gas is supplied inside the airbag from the inflator. The central opening is formed generally at the center of a square range (not identified) surrounded by the reinforcement region 7. Additionally, members 22, which are schematically shown in FIG. 4. (such as belt members) for regulating the inflation of the airbag are disposed inside the airbag A in a manner that the opposite end portions of each inflation regulating member are sewn respectively to the reinforcement regions 7, 7 of the front and rear side cloth parts 1, 2. Consequently, the airbag A is prevented from being torn or broken from the central opening or the sewn parts of the inflation regulating member end portions even when a high stress is concentrically and locally applied to the central opening or the sewn parts.

While the reinforcement regions 7, 7 have been shown and described as being formed respectively in the front and rear side cloth parts 1, 2 of the airbag A, it will be understood that the reinforcement region 7 may be formed in either one of the front and rear cloth parts 1, 2 of the airbag.

The advantageous effects of the embodiment of the present invention will be discussed with reference to FIGS. 3A and 3B depicting experimental results, in comparison with a conventional airbag which is constructed and arranged the same as that of the embodiment of FIGS. 1 and 2, with the exception that no reinforcement yarns such as yarns 5a, 5b are woven into both the front and rear side cloth parts (1, 2) of the airbag. The conventional airbag has the structure as shown in FIG. 1 except for absence of the reinforcement yarns 5a, 5b.

FIG. 3A shows a tensile force distribution in the doubly woven cloth (W) of the above-mentioned conventional airbag during a process of inflation of the airbag upon supply of high pressure gas into the airbag from an inflator. The tensile force distribution is within a particular region (on the front or rear side of the airbag) corresponding to the reinforcement region 7 of the embodiment of FIGS. 1 and 2. A curve 11 represents the variation of a tensile force applied to a warp yarn (1a) of the front side cloth part (1). A curve 12 represents the variation of a tensile force applied to a weft yarn (3a) of the front side cloth part (1). A curve 13 represents the variation of a tensile force applied to a warp yarn (1b) of the rear side cloth part (2). A curve 14 represents the variation of a tensile force applied to a weft yarn (3b) of the rear side cloth part (2). A curve 15 represents the maximum tensile force applied to the doubly woven cloth (W) of the conventional airbag.

FIG. 3B shows a tensile force distribution in the doubly woven cloth W of the airbag A of the embodiment of FIGS. 1 and 2 during a process of inflation of the airbag upon supply of high pressure gas into the airbag from the inflator. The tensile force distribution is within the reinforcement region 7 of the airbag of the embodiment of FIGS. 1 and 2. A curve 16 represents the variation of a tensile force applied to the warp yarn 1a of the front side cloth part 1. A curve 17 represents the variation of a tensile force applied to the weft yarn 3a of the front side cloth part 1. A curve 18 represents the variation of a tensile force applied to the warp yarn 1b of the rear side cloth part 2. A curve 19 represents the variation of a tensile force applied to the weft yarn 3b of the rear side cloth part 2. A curve 20 represents the maximum tensile force applied to the doubly woven cloth W of the airbag A.

A comparison of the graphs of FIG. 3A and those of FIG. 3B demonstrates the following facts: In case of the conventional airbag as shown in FIG. 3A, the tensile forces of the yarns (1a, 3a, 1b, 3b) increase or decrease generally like a straight line. Accordingly, as represented by the curve 15, a trough or lowered part 15a exists in the curve of the maximum tensile force. At the maximum tensile force trough, the tensile force rises up immediately after falling down, and therefore the yarns tend to be easily broken at the maximum tensile force trough 15a. In case of the airbag A of the embodiment of FIGS. 1 and 2, the tensile forces of the yarns 1a, 3a, 1b, 3b increase or decrease in manners having a generally flat top part at a high tensile force range. Accordingly, no trough or lowered part exists in the curve of the maximum tensile force as indicated by the curve 20, and therefore the yarns cannot be broken due to the concentrically applied stress. Thus, according to the embodiment of the present invention, the airbag can be effectively prevented from receiving abruptly a high stress while raising the strength of the cloth material of the airbag A. This renders unnecessary the need to employ particular reinforcement members at a location around the central opening and at locations where the inflation regulating belt members are sewn.

What is claimed is:

1. An airbag which is inflatable under a pressure of gas from an inflator, said airbag comprising;
   a doubly woven cloth including first and second cloth parts which are separable from each other to define therebetween a chamber to be filled with the gas from the inflator, each of said first and second cloth parts being woven with warp yarns and weft yarns; and
   a first reinforcement region formed in at least one of said first and second cloth parts, said first reinforcement region including a warp region extending parallel with an extension direction of said warp yarns, and a weft region extending parallel with an extension direction of said weft yarns, said warp and weft regions being continuous with each other, reinforcement yarns being woven in said warp and weft regions, said reinforcement yarns being higher in coefficient of extension than said warp and weft yarns, said warp region including first and second warp regions which are parallel with each other and opposite to each other with respect to a first vertical plane passing through a center of said at least one of said first and second cloth parts; and said weft region including first and second weft regions which are parallel with each other and opposite to each other with respect to a second vertical plane perpendicular to said first vertical plane and passing through said center, said first and second warp regions each being continous with said first and second weft regions, said first and second warp and weft regions constituting said first reinforcement region in a generally rectangular endless band shape;

wherein each of said first and second cloth parts is generally circular in plan, wherein each of said first and second warp regions are defined between first and second lines on said at least one of said first and second cloth parts, said first line forming an angle of about 55 degrees between it and a first tangent line which touches a periphery of said at least one of said first and second cloth parts at a first point through which said first line passes, said second line forming an angle of about 35 degrees between it and a second tangent line which touches the periphery of at least one of said first and second cloth parts at a second point through which said second line passes, said first and second lines being parallel with an extension direction of said warp yarns; and each of said first and second weft regions being defined between third and fourth lines on said at least one of said first and second cloth parts said third line forming an angle of about 55 degrees between it and a tangent line which touches the periphery of said at least one of said first and second cloth parts at a third position through which said third line passes, said fourth line forming an angle of about 35 degrees between it and a fourth tangent line which touches the periphery of said at least one of said first and second cloth parts at a fourth position through which said fourth line passes, said third and fourth lines being parallel with said weft yarns.

2. An airbag as claimed in claim 1, wherein said reinforcement yarns in said warp region are interlaced with said weft yarns, and said reinforcement yarns in said weft region are interlaced with said warp yarns.

3. An airbag as claimed in claim 1, wherein said reinforcement yarns in said warp region are interlaced with said reinforcement yarns in said weft region.

4. An airbag as claimed in claim 1, further comprising reinforcement region includes a second and third reinforcement region which corresponds to said first reinforcement region, said first reinforcement region being formed in said first cloth part, and said second reinforcement region being formed in said second cloth part.

5. An airbag as claimed in claim 1, wherein said at least one of said first and second cloth parts has an opening therein around which said first reinforcement region is formed to prevent said at least one of said first and second cloth parts from tearing at said opening when a high stress is applied to said at least one of said first and second cloth parts proximate said opening.

6. An airbag as claimed in claim 1, further comprising an inflation regulating member which is connected to said reinforcement region at an attachment area so that said at least one of said first and second cloth parts does not tear at the attachment area when a high stress is applied proximate to said attachment area.

7. An airbag as recited in claim 1, further comprising a second reinforcement region which is structurally the same as said first reinforcement region and which is formed in the other of said at least one of said first and second cloth parts.

* * * * *